(12) United States Patent
Pohl et al.

(10) Patent No.: US 11,385,648 B2
(45) Date of Patent: Jul. 12, 2022

(54) INCLEMENT WEATHER CONDITION AVOIDANCE

(71) Applicant: Intel Corporation, Santa Clara, CA (US)

(72) Inventors: Daniel Pohl, Puchheim (DE); Maik Sven Fox, Rheinstetten (DE); Cagri Tanriover, Bethany, OR (US)

(73) Assignee: Intel Corporation, Santa Clara, CA (US)

( * ) Notice: Subject to any disclaimer, the term of this patent is extended or adjusted under 35 U.S.C. 154(b) by 256 days.

(21) Appl. No.: 16/727,940

(22) Filed: Dec. 27, 2019

(65) Prior Publication Data
US 2020/0142419 A1 May 7, 2020

(51) Int. Cl.
*G05D 1/02* (2020.01)
*G01W 1/10* (2006.01)

(52) U.S. Cl.
CPC .......... *G05D 1/0214* (2013.01); *G01W 1/10* (2013.01); *G05D 1/0274* (2013.01); *G01W 2203/00* (2013.01); *G05D 1/0231* (2013.01); *G05D 2201/0213* (2013.01)

(58) Field of Classification Search
CPC .. G05D 1/0214; G05D 1/0274; G05D 1/0231; G05D 2201/0213; G05D 1/0246; G05D 1/0278; G01W 1/10; G01W 2203/00; G01W 1/02; Y02A 90/10; G08G 1/096725; G08G 1/0967; H04W 4/40
See application file for complete search history.

(56) References Cited

U.S. PATENT DOCUMENTS

| | | | | |
|---|---|---|---|---|
| 10,373,259 B1 * | 8/2019 | Konrardy | ............... | G06Q 40/00 |
| 10,395,526 B1 * | 8/2019 | Slusar | ............... | G01C 21/3453 |
| 11,157,008 B2 * | 10/2021 | Dean | .................... | G05D 1/0214 |
| 2016/0042644 A1 * | 2/2016 | Velusamy | ............ | G08G 1/0116 340/435 |
| 2020/0284601 A1 * | 9/2020 | Myers | .................. | G06Q 10/047 |

OTHER PUBLICATIONS

Rocky Mountain Insurance Information Association; "Hail" http://www.rmiia.org/catastrophes_and_statistics/Hail.asp; 2015; retrieved on Dec. 18, 2019; 4 pages.

* cited by examiner

*Primary Examiner* — Rodney A Butler
(74) *Attorney, Agent, or Firm* — Viering, Jentschura & Partner Mbb (57) ABSTRACT

A vehicle relocator may include one or more processors, which are configured to receive first sensor data representing a current or predicted weather condition; receive second sensor data representing at least position or a vicinity of a vehicle; determine from at least the first sensor data and the second sensor data a risk of damage to the vehicle; and if the determined risk is outside of a target range, send an instruction for the vehicle to travel to an alternate location.

21 Claims, 5 Drawing Sheets

| | 510 Vehicle is uncovered | 512 Vehicle is near a tree | 514 Vehicle is near tiled roof | 516 Vehicle is at low elevation | 518 Vehicle is open convertable |
|---|---|---|---|---|---|
| 502 Heavy winds | | X | X | | |
| 504 Heavy Rain | | X | | X | X |
| 506 Heavy snow | | | | | X |
| 508 Hail | X | | | | X |

FIG. 6

INCLEMENT WEATHER CONDITION AVOIDANCE

TECHNICAL FIELD

Various aspects relate generally to vehicle detection of inclement weather conditions and strategies for reducing risk relative to same.

BACKGROUND

An increased risk of damage to vehicles may exist in harsh or inclement weather. Natural disasters may generate sufficient wind to damage vehicles, either directly by pulling or tearing a portion of the vehicle from the vehicle frame, or indirectly by forcing a foreign object to collide with the parked vehicle. Hail may break or shatter glass, or otherwise damage a vehicle's exterior. Open, convertible vehicles may be severely damaged by the mere presence of ordinary rain. In short, a variety of risks may be presented to vehicles by various weather occurrences.

In many instances in which weather results in damage to vehicles, the risk and the eventual occurrence of damage may be largely tied to a location of the vehicle. That is, a vehicle may have been damaged in one location, but not have been damaged had the vehicle been in a different location.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of (objects)", "multiple (objects)") referring to a quantity of objects expressly refers more than one of the said objects. The terms "group (of)", "set (of)", "collection (of)", "series (of)", "sequence (of)", "grouping (of)", etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data," however, is not limited to the aforementioned examples and may take various forms and represent any information as understood in the art.

The term "processor" as, for example, used herein may be understood as any kind of entity that allows handling of data. The data may be handled according to one or more specific functions executed by the processor. Further, a processor as used herein may be understood as any kind of circuit, e.g., any kind of analog or digital circuit. The term "handle" or "handling" as for example used herein referring to data handling, file handling or request handling may be understood as any kind of operation, e.g., an I/O operation, and/or any kind of logic operation. An I/O operation may include, for example, storing (also referred to as writing) and reading.

A processor may thus be or include an analog circuit, digital circuit, mixed-signal circuit, logic circuit, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Differences between software and hardware implemented data handling may blur. A processor, controller, and/or circuit detailed herein may be implemented in software, hardware and/or as hybrid implementation including software and hardware.

The term "system" (e.g., a computing system, a control system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

As used herein, the term "memory", and the like may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa.

The term "vehicle" as used herein may be understood as any suitable type of vehicle, e.g., any type of ground vehicle, a watercraft, an aircraft, or any other type of vehicle. In some aspects, the vehicle may be a motor vehicle (also referred to as automotive vehicle). As an example, a vehicle may be a car also referred to as a motor car, a passenger car, etc. As another example, a vehicle may be a truck (also referred to as motor truck), a van, etc.

The term "lane" with the meaning of a "driving lane" as used herein may be understood as any type of solid infrastructure (or section thereof) on which a vehicle may drive. In a similar way, lanes may be associated with aeronautic traffic, marine traffic, etc., as well.

According to various aspects, information (e.g., hazard identification information, obstacle condition information, etc.) may be handled (e.g., processed, analyzed, stored, etc.) in any suitable form, e.g., data may represent the information and may be handled via a computing system. The hazard condition may be used herein with the meaning of any detectable characteristic of the hazard itself and/or associated with the hazard. A risk that originates from a person or object that is associated with the hazard, may be treated in the analysis (as described herein) as a risk potential assigned to the hazard.

In some aspects, one or more range imaging sensors may be used for sensing hazards and/or persons and/or objects that are associated with a hazard in the vicinity of the one or more imaging sensors. A range imaging sensor may allow associating range information (or in other words distance information or depth information) with an image, e.g., to provide a range image having range data associated with pixel data of the image. This allows, for example, providing a range image of the vicinity of a vehicle including range information about one or more objects depicted in the image. The range information may include, for example, one or more colors, one or more shadings associated with a relative distance from the range image sensor, etc. According to various aspects, position data associated with positions of objects relative to the vehicle and/or relative to an assembly of the vehicle may be determined from the range information. According to various aspects, a range image may be obtained, for example, by a stereo camera, e.g., calculated from two or more images having a different perspective. Three-dimensional coordinates of points on an object may be obtained, for example, by stereophotogrammetry, based on two or more photographic images taken from different positions. However, a range image may be generated based on images obtained via other types of cameras, e.g., based on time-of-flight (ToF) measurements, etc. Further, in some aspects, a range image may be merged with additional sensor data, e.g., with sensor data of one or more radar sensors, etc.

In one or more aspects, a driving operation (such as, for example, any type of safety operation, e.g., relocation) may be implemented via one or more on-board components of a vehicle. The one or more on-board components of the vehicle may include, for example, a one or more cameras (e.g., at least a front camera), a computer system, etc., in order to detect hazards and to trigger an hazard avoidance function (e.g., relocation) to avoid damage to the vehicle. The one or more on-board components of the vehicle may include, for example, a one or more cameras, a computer system, etc., in order to detect a hazard and to relocate.

According to various aspects, a voxel map may be used to describe objects in the three dimensional space based on voxels associated with objects. To detect objects, follow objects, or otherwise based on a voxel map, ray-tracing, ray-casting, rasterization, etc., may be applied to the voxel data.

As an example, a depth image may include information to indicate a relative distance of objects displayed in the image. This distance information may be, but is not limited to, colors and/or shading to depict a relative distance from a sensor. Positions of the objects may be determined from the depth information. Based on depth images, a two dimensional map or a three dimensional map may be constructed from the depth information. Said map construction may be achieved using a depth map engine, which may include one or more processors or a non-transitory computer readable medium configured to create a pixel or voxel map (or any other suitable map) from the depth information provided by the depth images. According to various aspects, a depth image may be obtained by a stereo camera, e.g., calculated from two or more images having a different perspective. Further, a depth image may be generated by any suitable one or more sensors (e.g. a laser scanner, etc.) that may allow for a correlation of position information and distance (depth) information.

According to various aspects, a map may be used to store position information and/or the ambient condition information in a suitable form of data that allows controlling one or more operations of the vehicle based on the map. However, other suitable implementations may be used to allow control of the vehicle based on at least the movement data.

According to various aspects, one or more sensors and a computing system may be used to implement the functions described herein. The computing system may include, for example, one or more processors, one or more memories, etc. The computing system may be communicatively coupled to the one or more sensors (e.g., of a vehicle) to obtain and analyze sensor data generated by the one or more sensors. According to some aspects, the one or more processors may be configured to generate depth images in real-time from the data received from one or more range imaging sensors and analyze the depth image to find one or more features associated with conditions that represent a risk potential.

Several aspects are described herein exemplarily with reference to a vehicle, wherein one more other hazards present in a vicinity of the vehicle.

Various aspects of the principles, devices, and procedures described herein may utilize detected position information, such a position value of a vehicle with respect to Earth, in combination with one or more data sources including position information of one or more overpasses, to determine details of a vicinity of the vehicle. That is, various systems (commercial, open-source, or otherwise) offer detailed information of roadways, buildings, structures, parking spaces, landmarks, natural features (i.e., flora and fauna) and can be refined, narrowed, or limited in conjunction with detected position information.

Figure 1:
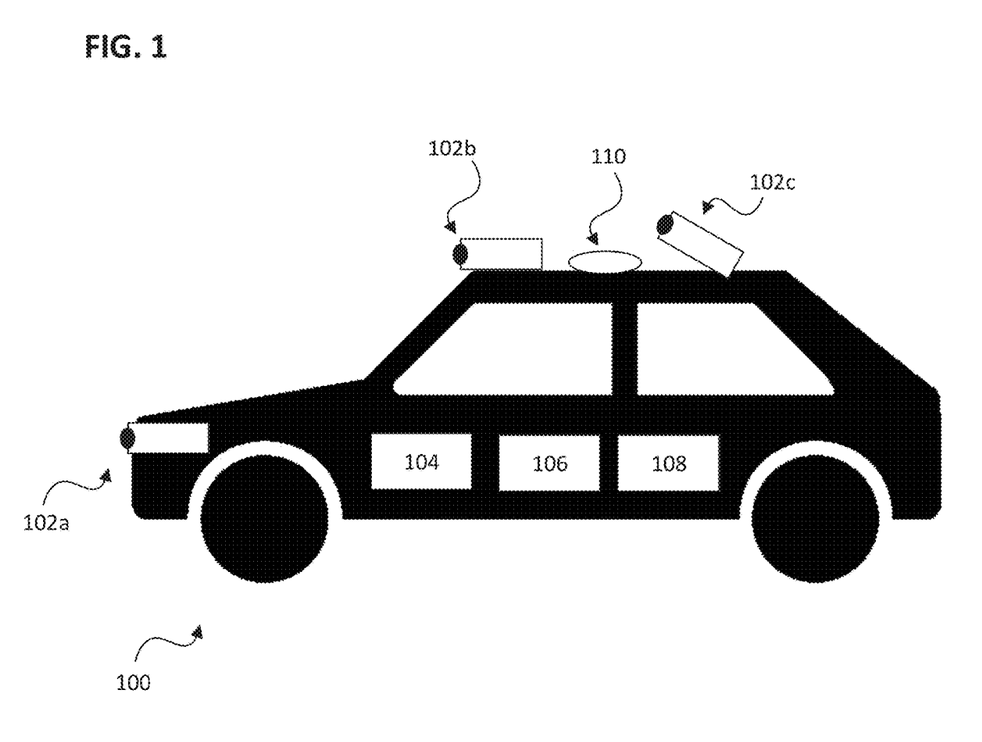
FIG. 1 shows a vehicle configured to obtain image sensor data of a vicinity of the vehicle.

FIG. 1 depicts a vehicle 100 configured with one or more image sensors 102a, 102b, and 102c, which may be configured to receive image sensor information from a vicinity of the vehicle and to convert the image sensor information into image sensor data, which may be then provided to one or more processors 104 for further processing. The one or more processors 104 may be configured to utilize one or more algorithms, one or more artificial intelligences, and/or one or more databases, tables, or other information sources stored in one or more memories 106. The vehicle may be configured with one or more position sensors 110, which may be configured to obtain position sensor information from one or more position sources, and to detect a position of the vehicle using the received position sensor information. The one or more position sensors 110 may be configured to provide detected position information to the one or more processors 104, which may be configured to carry out one or more processes using the detected position. The vehicle may include one or more additional sensors 108, which are configured to deliver sensor data representing a current or a predicted (i.e. future, anticipated) weather condition. The one or more additional sensors 108 for weather information may include one or more receivers or transceivers, configured to wirelessly receive weather information from any source whatsoever, whether an internet address, a website, a database, a propriety weather-information source, an emergency notification source, or otherwise. The one or more additional sensors 108 may include one or more sensors that are capable of sensing current conditions associated with weather (temperature, air pressure, humidity, wind speed, etc.) and to deliver this detected information to the one or more processors, which may be configured to predict one or more weather conditions.

Catastrophic weather events can be quite costly. Even when a given individual is insured against the risk of damage, claims resulting from catastrophic weather events may represent a significant expense for insurance companies. Some of this damage results from vehicles being in susceptible areas during extreme weather events.

Any given parked vehicle may have a greater risk or a lesser risk of damage resulting from extreme weather, depending on the nature of the extreme weather and characteristics of the area in which the vehicle is parked. A vehicle (e.g. such as an autonomous vehicle) that is able to assess the likelihood of an extreme weather condition, and also to assess characteristics of an environment in which is parked, can be configured to determine a risk of damage due to the extreme weather event, and two, where prudent, relocate to a safer environment.

The ability for a vehicle to perform the calculations described herein may allow the vehicle to evade damage from extreme and/or catastrophic weather conditions, to which it may otherwise have been subject.

According to an aspect of the disclosure, a vehicle may be equipped with wireless connectivity to determine the likelihood of an extreme weather event. It may be common in modern vehicles for a vehicle to include a wireless connectivity feature. Such wireless connectivity features may include, but are not limited to, Long term Evolution ("LTE"), 4G, or 5G cellular technology; Vehicle-to-Vehicle communication, Vehicle-to-Everything communication, or any other kind of wireless connectivity. Vehicles connected to such Internet-based forms of wireless communication may access one or more databases, websites, or otherwise to assess the weather (a current weather condition, a future weather condition, a possibility of a severe weather condition, a likelihood of a severe weather condition, or otherwise). Alternatively or additionally, vehicles may be configured to connect to one or more weather-specific services. These may include, but are not limited to, satellite weather reports, terrestrial-based radiofrequency weather reports, or otherwise. Alternatively or additionally, one or more weather stations (devices to receive weather information wirelessly, whether via transmission of weather information, sensing of weather-related factors, or a combination of the two) may be included inside the vehicle. The one or more weather stations may include one or more sensors would could optionally be placed outside of the vehicle to obtain additional sensor data. While those are not as reliable as a real weather forecast, they could provide at least some basic inputs.

The vehicles may include certain autonomous driving capabilities. Based on the determined whether information and a calculation of risk related to the vehicle's current location, the vehicle may be configured to relocate. Such relocation may require the ability to operate or drive autonomously. Throughout this disclosure, the relocation may be described as a completely autonomous function, which may generally correspond to a level 5 autonomous driving operation, using the conventional scale from 0 to 5, in which 0 represents no automation, 1 represents driver assistance, 2 represents partial automation, 3 represents conditional automation, 4 represents high automation, and 5 represents complete automation.

The relocation described herein may be configured, depending on the implementation, to involve traveling up only a short distance or traveling for only a short time. Given the limited duration of subject travel and/or the limited set of circumstances in which said travel is likely to occur, it is conceivable that legal jurisdictions may permit a re-categorization of the relocation disclosed herein from a level 5 autonomous vehicle operation to a level 4 autonomous vehicle operation. This may enable many vehicles approved for level 4 operation to perform the principles and methods described herein without requiring a level 5 certification.

Sensor input may be necessary to derive information about a surrounding of the vehicle and/or to identify a suitable spot for the vehicle relocation. The specific sensors used may be selected based on the desired implementation, without restriction. According to one aspect of the disclosure, one or more image sensors (i.e. cameras, depth cameras, video cameras, lidar, radar, or otherwise) may be used to obtain information about the surroundings of the vehicle. It is common for vehicles to be manufactured with a variety of image sensors, and these image sensors, which may otherwise fulfill one or more specialized purposes for the vehicle, may also provide image sensor data for the procedures described herein. That is, any image sensors otherwise installed on the vehicle may additionally provide information to the one or more processors disclosed herein that evaluate weather-related risk and, when appropriate, that cause the vehicle to relocate.

Many current vehicles include image sensors that provide image sensor data of a 360° radius surrounding a vehicle. The use of such comprehensive image sensor data may result in improved risk detection and/or improved identification of destinations for relocation. In the event that fewer than 360° of coverage is available, sensor data providing fewer than 360° of coverage may be used. For example, some vehicles include image sensors that provide only a view in front of the vehicle, only a view behind the vehicle, only a view to the side of the vehicle, or any combination thereof. Even in such circumstances in which fewer than 360° of image sensor data coverage is available, the corresponding image sensor data may be utilized for the principles and methods described herein.

Figure 2:
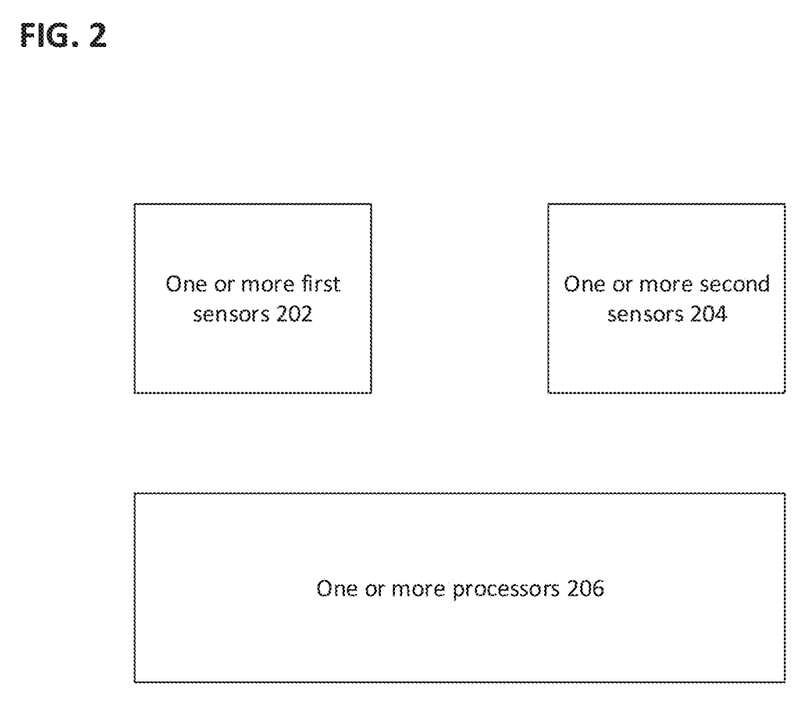
FIG. 2 depicts a vehicle relocation system according to aspect of the disclosure.

According to one aspect of the disclosure, the principles and methods disclosed herein may be performed by a vehicle relocation system including a plurality of sensors and one or more processors. FIG. 2 depicts a vehicle relocation system according to aspect of the disclosure, the vehicle relocation system including one or more first sensors 202, configured to receive first sensor information and to output first sensor data representing a current or predicted weather condition; one or more second sensors 204, configured to receive second sensor information any to output second sensor data representing at least a position or a vicinity of a vehicle; and one or more processors 206, configured to: determine from the first sensor data and the second sensor data a risk of damage to the vehicle; and if the determined risk is outside of a target range of acceptable risk, send an instruction for the vehicle to travel to an alternate location.

Figure 3:
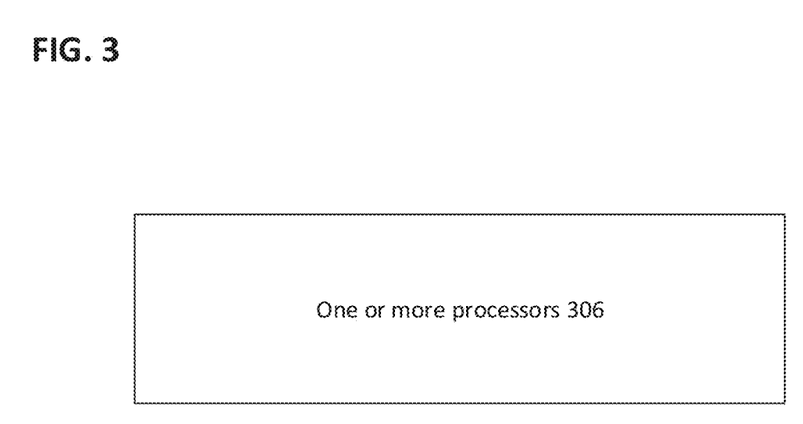
FIG. 3 depicts a vehicle relocator according to an aspect of the disclosure.

According to another aspect of the disclosure, the principles and method disclosed herein may be performed by one or more processors. Many vehicles already include a variety of sensors that provide sensor data for autonomous diving operations and semi-autonomous driving operations. The data from these sensors may be utilized by one or more processors to carry out the vehicle relocation described herein. FIG. 3 depicts a vehicle relocator according to an aspect of the disclosure, the vehicle relocator including one or more processors, configured to receive first sensor data representing a current or predicted weather condition; receive second sensor data representing at least a position or a vicinity of a vehicle; determine from at least the first sensor data and the second sensor data a risk of damage to the vehicle; and if the determined risk is outside of a target range, send an instruction for the vehicle to travel to an alternate location.

Figure 4:
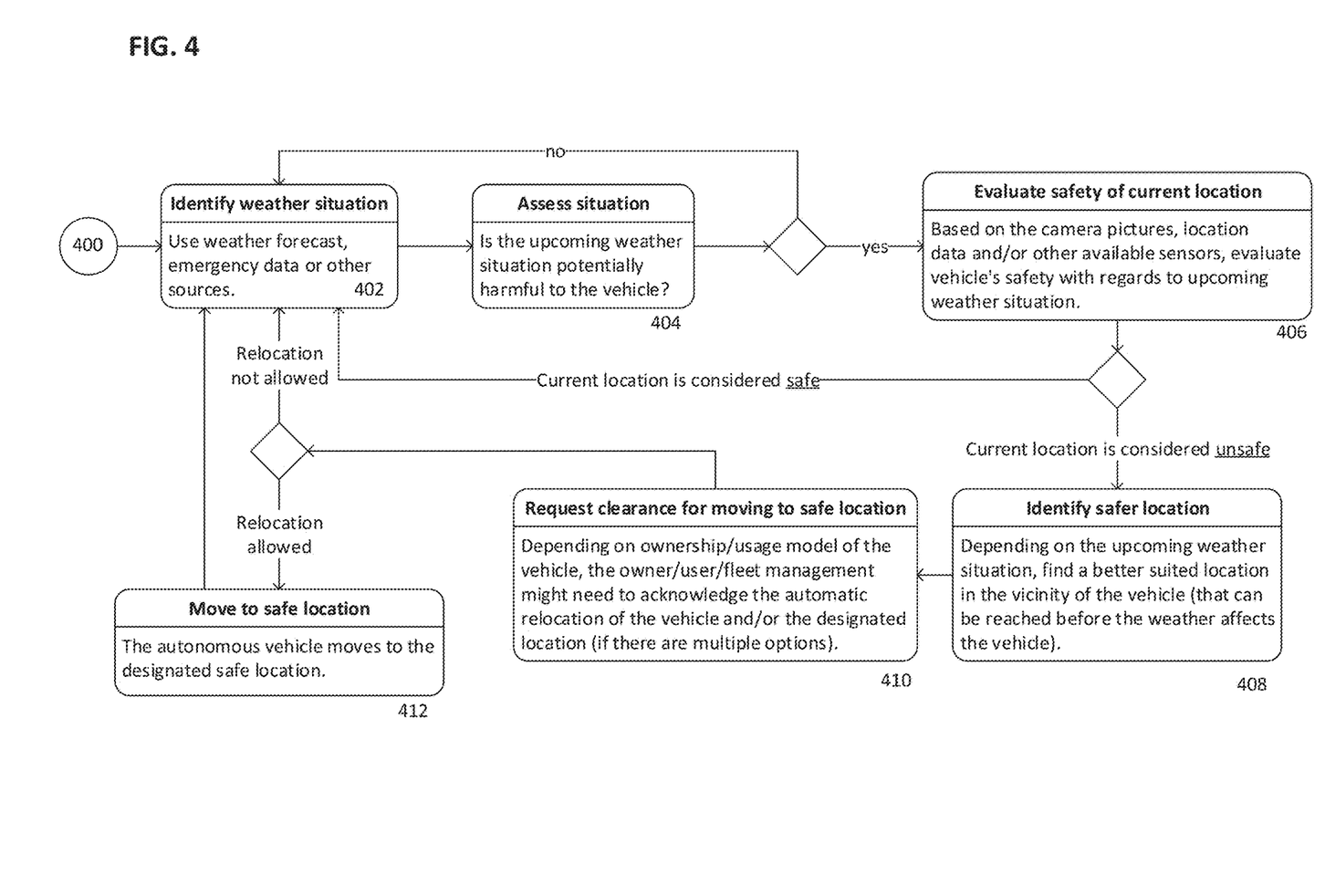
FIG. 4 depicts a procedure for risk assessment and/or alternative location determination.

FIG. 4 depicts a procedure for risk assessment and/or alternative location determination 400, according to an aspect of the disclosure. In this case, the vehicle may be configured with one or more sensors that permit the vehicle to obtain weather information 402. The weather information may be obtained through any source whatsoever. Nonlimiting examples of weather information that may be utilized include weather forecast data, emergency data emergency management data, sensor information (temperature, pressure, humidity, etc.), current weather observation data, or otherwise.

Once the weather data has been received, the vehicle may assess whether the weather may be harmful to the vehicle 404. That is, some weather conditions may be associated with a risk of harm under certain circumstances, whereas other weather conditions are generally not associated with a risk of harm. For example, dry, sunny weather is not generally associated with a risk of harm or damage to a vehicle. On the other hand, heavy rain, heavy snow, hail, heavy wins etc., may be associated with the risk of damage to a vehicle under certain circumstances.

If the type of weather condition is a weather condition that may be associated with a potential risk of danger, the vehicle may evaluate the safety of its current location in light of the weather condition 406. This evaluation may be performed using at least one other source of sensor data, which may include, but is not limited to, image sensor data (camera pictures or video pictures), location data, location data coupled with map data or navigation data, or any other sensor information. Image sensor data may be utilized to evaluate the vicinity of the vehicle for the presence of one or more hazards that may present a danger to the vehicle in light of the weather condition. For example, and as will be described in greater detail, hail may present a danger to the vehicle when the vehicle is uncovered, or heavy winds may present a danger to the vehicle when the vehicle is near objects that may be thrust into the vehicle during heavy winds.

The determination of risk may be qualitative and/or quantitative. That is, the combination of hazards relative to the location in conjunction with a weather condition may be determined as presenting a risk or presenting no risk (i.e. a qualitative calculation). Alternatively or additionally, the calculation may be quantitative in that varying degrees of risk may be associated with combinations of weather conditions and identified hazards. The specific amount of risk for these varying combinations of weather condition and prospective hazard may be a matter of preference for implementation, and thus need not be quantitatively set in this disclosure. Options for programming or setting these risks may include assigning predetermined risks to various combinations of hazards and weather conditions; using one or more artificial intelligences to determine risk of one or more weather conditions and one or more identified hazards based on previous data of at least previous weather conditions, previous identified risks, and damages resulting therefrom; or otherwise.

The one or more processors may be configured to evaluate the determined risk for safety. According to one aspect of the disclosure, the determination of a qualitative risk may be sufficient to trigger relocation. That is, when no qualitative risk is determined, the current location may be considered safe and the procedure of identifying the weather situation 402 may resume. Conversely, when a qualitative risk is determined, procedure for relocation may be instigated. Alternatively or additionally, in the event that the risk is qualitative, a range of acceptable risk may be predetermined, and the one or more processors may be configured to initiate relocation when the qualitative risk determined is outside of a predetermined range of acceptable risk. Conversely, the one or more processors may be configured to define the area as being reasonably safe when the quantitative determine risk is within a predetermined range of acceptable risk.

In the event that the area is defined as being unsafe, or at least the area is not defined as being safe, the one or more processors may seek to identify a safer location (i.e. an alternative location or a location for relocation) 408. Depending on the current or upcoming weather situation, the safer location may be a location that is better suited in light of the weather condition and which is within a vicinity of the vehicle.

If a safer location is identified, the vehicle may optionally request clearance or approval for moving to the safer location 410. That is, depending on the ownership or the usage model of the vehicle, the owner or the user or the fleet manager may be required to approve (or otherwise not disapprove) a request to relocate.

Once the prerequisites for relocation have been established, the vehicle may proceed with relocation 412. In this step, the vehicle may move to the safer location (the alternative location or location for relocation) and come to arrest. According to an aspect of the disclosure, the vehicle may continue to evaluate the weather conditions 402 and potentially seek additional relocation, should the calculation of risks prompt such further action.

Figure 5:
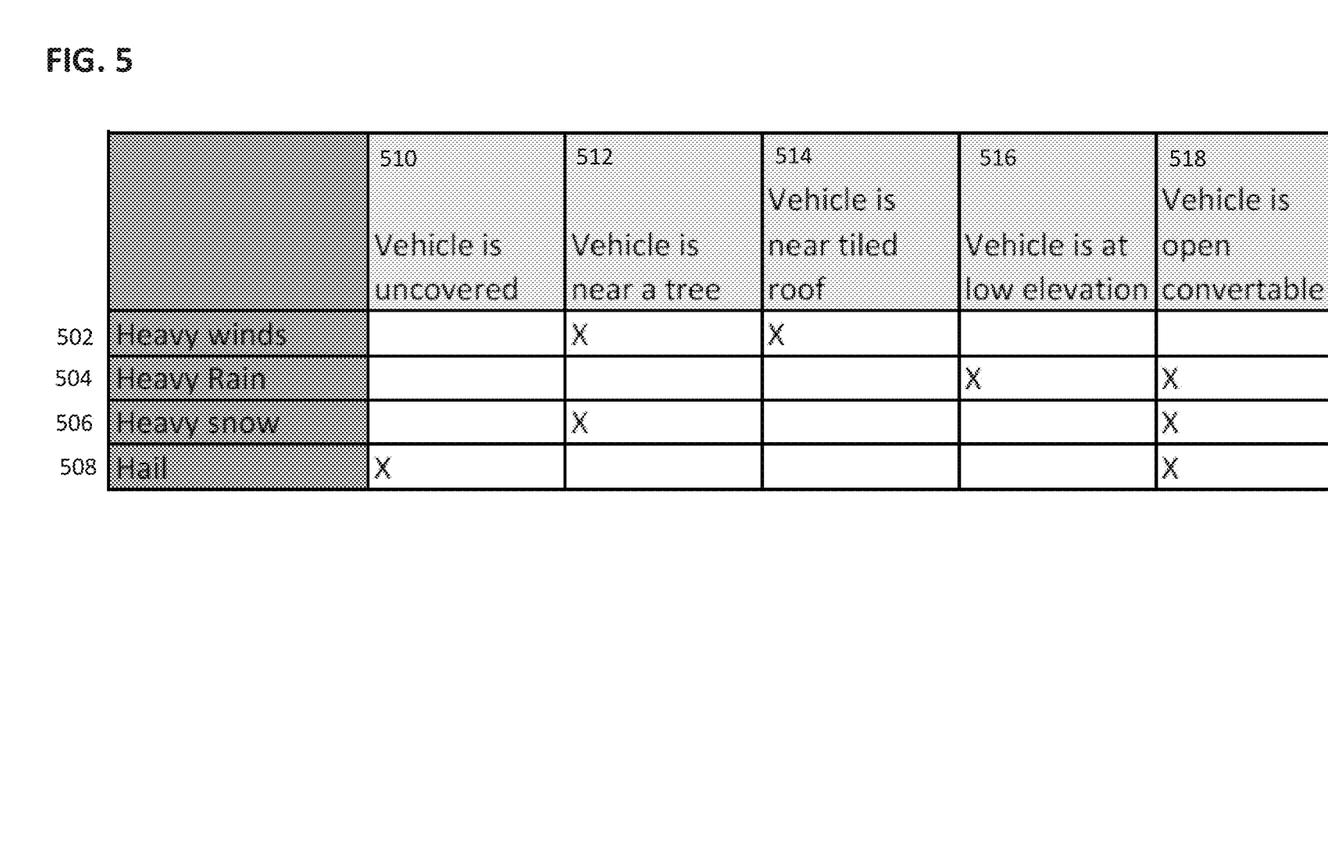
FIG. 5 shows qualitative risk analysis.

FIG. 5 depicts an example of a qualitative risk analysis. As described herein, the risk of damage to a vehicle may be largely considered as a function of weather condition (current or predicted) and vehicle condition (generally, what the vehicle is near, where the vehicle is, or whether the vehicle's roof is open (for a convertible)). In this figure, the weather conditions of heavy winds 502, heavy rain 504, heavy snow 506, and hail 508 are assessed in light of the vehicle conditions of being uncovered 510, being near a tree 512, being near a tiled roof 514, being at a low elevation 516, and having an open roof (for a convertible) 518. This figure shows that no one weather condition necessary presents a significant risk of danger to the vehicle (although very significant natural disasters such as a tornado may provide otherwise), but rather that the danger of a given weather condition is greatly impacted by the vehicle condition. Here, heavy winds 502 may be dangerous when the vehicle is near a tree 512 or near a tiled roof 514, but not by virtue of the fact that the vehicle is at low elevation 516. The chart provided herein in FIG. 5 is provided for demonstrative purposes and is not intended to be limiting. The weather conditions to be evaluated may be greater, fewer, or otherwise different from those presented herein. Similarly, the vehicle conditions may be greater or fewer or otherwise different from those presented herein. Moreover, the conclusions of when a danger exists may be different for any given implementation, as desired.

Figure 6:
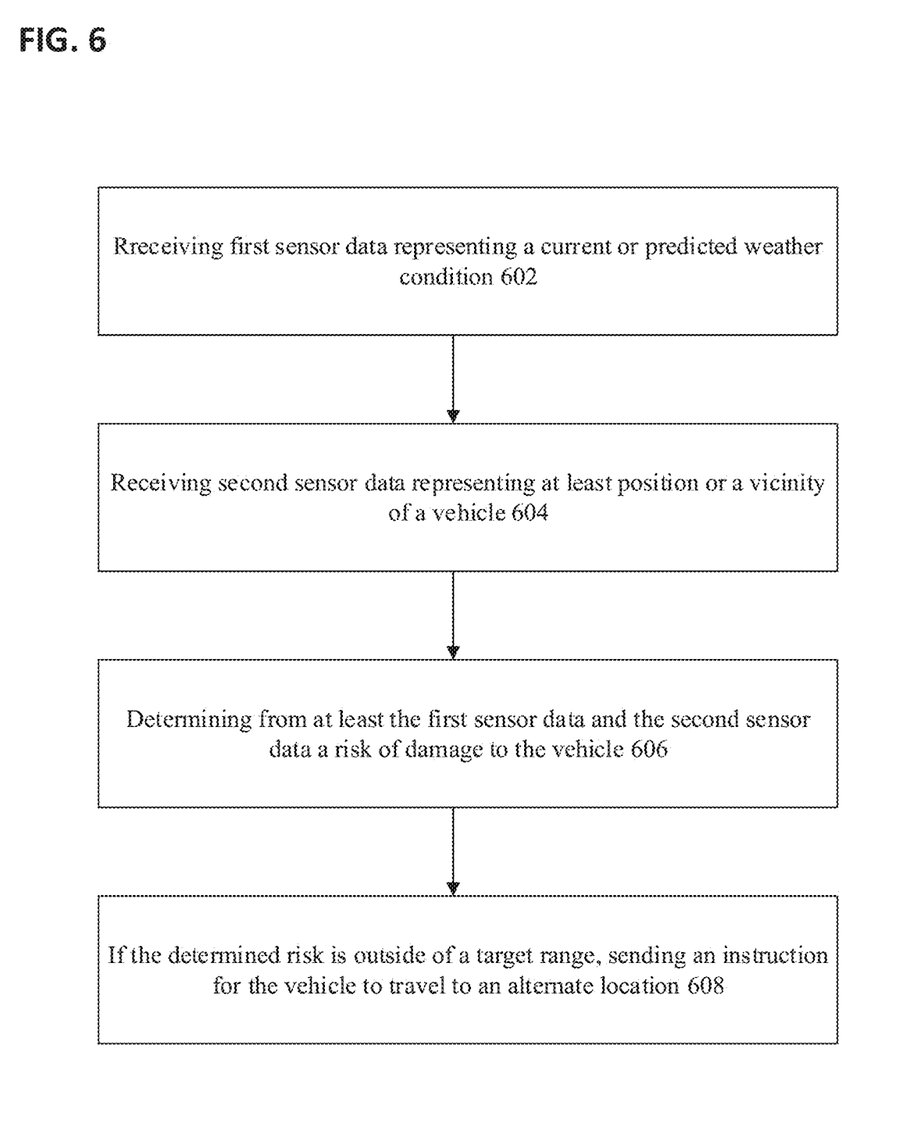
FIG. 6 shows a method of vehicle relocation.

FIG. 6 depicts a method of vehicle relocation including receiving first sensor data representing a current or predicted weather condition 602; receiving second sensor data representing at least a position or a vicinity of a vehicle 604; determining from at least the first sensor data and the second sensor data a risk of damage to the vehicle 606; and if the determined risk is outside of a target range, sending an instruction for the vehicle to travel to an alternate location 608.

The system described herein may be configured to perform a risk calculation and/or evaluate the need for relocation at any frequency desired or upon any triggering event. Most or all of the evaluations performed by the vehicle are likely to be performed while the vehicle is parked and the ignition is not running. As such, the operations disclosed herein are likely to rely heavily or entirely upon battery reserves. Accordingly, it may be desirable to configure the vehicle (e.g. the one or more processors performing the principles and methods disclosed herein) to evaluate risk of damage from weather and/or possible spaces for relocation on a more frequent or less frequent basis, depending on the desired result and the available of reserve power. According to one aspect of the disclosure, the one or more processors may be configured to perform the risk evaluation and/or relocation evaluation at a predetermined interval (e.g. every five minutes, every ten minutes, every twenty minutes, every half-hour, etc.) without limitation.

According to another aspect of the disclosure, the frequency of risk evaluation and/or relocation evaluation may be dependent on an available power reserve. That is, one or more meters may be utilized to evaluate an available power supply of a vehicle's battery. Based on the results of the evaluation, the frequency of the risk evaluation or relocation evaluation may be altered. For example, is anticipated that the voltage of a vehicle's battery may decrease as the battery becomes exhausted. As such, a meter capable of measuring voltage (or capable of measuring a value that can be equated to voltage using one or more known variables) may be used to determine a frequency of the risk evaluation or relocation evaluation. That is, the one or more processors performing the risk evaluation and/or relocation evaluation may also receive sensor data from the meter capable of measuring voltage, and a frequency of the risk evaluation and/or relocation evaluation may be altered accordingly.

Through whatever source that weather information is obtained, it may be sought to identify information about the risk of inclement weather, such as, but not limited to, hail, flooding, rain, freezing following precipitation, significant amounts of snow (e.g. greater than a threshold, such as greater than 50 cm), strong wins, any combination thereof, etc.

Sensor data may be utilized to evaluate a vicinity of a vehicle and ascertain a risk of damage associated with a weather hazard. As described above, image sensor data may be utilized for this purpose. In addition, other sensor data may be utilized, such as, but not limited to, one or more position sensors. The one or more position sensors may be sensors configured to operate according to the global positioning network or any other positioning system. To the extent that one or more positioning sensors are utilized, said positioning sensors may deliver a detected location relative to a reference point (i.e. relative to the earth or a reference point on earth).

To contextualize this data, it may be necessary to obtain one or more maps or one or more other such sources of information. For example, a detected GPS position may provide little information regarding a particular danger to a vehicle from weather; however, the GPS position may be cross-referenced with one or more maps which may provide additional information that may assist the one or more processors in detecting a risk related to weather. For example, if the positioning sensor data and map data indicate that the vehicle is located on a bridge, there may be a greater likelihood of damage to the vehicle resulting from certain kinds of weather that may have a deleterious effect on said bridge. Similarly, map data indicating that the vehicle is in a valley or a point of depression may correspond with an increased risk of damage to the vehicle resulting from flooding. That is, certain aspects of map data may be correlated to weather hazards, and these correlations may assist the one or more processors in evaluating risk.

A similar process may be used for other sensor data as well. The one or more image sensors may obtain information about a vicinity of the vehicle, and this information may be utilized to determine risk. For example, the one or more image sensors may obtain image sensor data representing a vicinity of the vehicle. This image sensor data may be analyzed to determine the presence of one or more obstacles, hazards, or potentially hazardous situations, which may be evaluated in light of weather information. For example, the presence of a tree near a vehicle is, in and of itself, not a hazardous condition. However, when combined with a likelihood of very strong wins (tornado, hurricane, or other such natural disaster) a tree in close proximity to a vehicle may represent a hazard, as the tree may be caused to fall and result in damage to the vehicle. Similarly, a vehicle being uncovered (i.e. not being beneath a roof) may not, in and of itself, present a hazard. However, when combined with a forecast of hail, for instance, the fact that the vehicle is uncovered may represent a significant risk of damage to the vehicle. Sensor data, such as image sensor data, may be utilized to determine, for example, whether the vehicle is covered, whether the vehicle is near a tree, whether the vehicle is near any other falling hazard, or otherwise.

Similarly, image sensor data may be utilized to identify a potentially safer place for relocation. That is, if the vehicle is uncovered, and an available, covered spot can be identified within image sensor data, the image sensor data may be used to identify a spot for relocation. Similarly, if the vehicle is near a tree or other falling hazard, and an available, nearby space (but far enough away from the tree or falling hazard so as to be considered safe) can be identified, then the sensor data may be utilized to identify a spot for relocation.

Moreover, the combination of map data and/or position sensor data may be utilized to identify a spot for relocation. Commercial map data often includes a variety of information beyond the mere presence of roadways. For example, commercial map information may include any of bridges, wide shoulders, embankments, open parking lots, covered parking lots, shelters, or any of a variety of other aspects of interest for determining a spot for relocation.

Assuming that the vehicle is parked, the position sensor may derive an absolute position of the vehicle or a position of the vehicle relative to a fixed point. This position information may be combined with map data (navigational data) to determine, for example, whether the vehicle is parked in a private garage or a public parking garage.

Depending on the location of the vehicle and the reception that is available at said location, the position sensor data may be insufficient to obtain a position reading. In this instance, the last known or last available position sensor data that was successfully obtained may be utilized, as this last received position sensor data is likely to represent a position in close proximity to the current position.

As described above, image sensor data may be obtained to evaluate a vicinity of the vehicle. For example, one or more processors may be configured to receive image sensor data and evaluate the data to determine whether, for instance, the vehicle is parked in an open space; the vehicle is parked under a tree; half of the vehicle is covered, while the other half is uncovered; the vehicle is parked in a car port; the vehicle is parked in a garage; etc.

Weather information may then be assessed in conjunction with the information of the vicinity of the vehicle (usually determined at least through any or any combination of position data, map data, navigational data, or image sensor data) to assess a risk of damage to the vehicle. For example, when hail is expected but the vehicle is parked under a large roof, the risk of damage to the vehicle due to hail would be assumed to be very low or absent altogether. Conversely, if flooding is expected and the vehicle is parked under a roof, but the parking spaces located in a area of low elevation (e.g. a depression), a high risk of damage to the vehicle may be ascertained. In this manner, it becomes apparent that most individual factors, whether the weather or the vicinity of the vehicle, are not individually conclusive as to the risk of damage associated with the vehicle. Rather, the combination of whether (such as the type of severe weather expected) and the surroundings of the vehicle in combination yield information about a prospective risk of damage to the vehicle.

The risk to the vehicle may be qualitative and/or quantitative. Regarding a qualitative risk, the factors described above may be assessed to determine a type of damage likely to occur to the vehicle, whether damaged glass, external damage, superficial damage, flooding damage, crushing damage, or otherwise. The qualitative assessment of damage or prospective damage may be utilized in deciding whether to relocate.

The damage assessment may also be quantitative. In this case, it may be determined how much damage may be expected to occur. At this juncture, it may be assumed that any autonomous relocation carries with it a risk to the vehicle. For example, until autonomous vehicles reach safety results superior to those of manned vehicles, autonomous relocation may carry with it a risk of damage to the vehicle greater than a comparative manned relocation. Moreover, the mere act of relocation requires that the vehicle leave its place of rest (i.e. its parking space) and travel to a new space for relocation. It is always conceivable that the relocation spot may become unavailable before the vehicle reaches the spot for relocation. It is also conceivable that the former space where the vehicle was at rest may become unavailable shortly after the vehicle leaves the space. In this way, relocation is associated with a risk that the vehicle may be unable to relocate or need to travel farther than anticipated to achieve relocation. As such, relocation is always associated with a risk.

According to an aspect of the disclosure, the vehicle may weigh its determined risk of damage to determine whether to relocate. The vehicle may be configured, for example, to relocate when the determined risk of damage to the vehicle is outside of a predetermined range. That is, a range of tolerable risk may be established, and the vehicle may first be prompted to relocate when the assessed risk of damage to the vehicle is outside of the tolerable range of risk. By way of example, and without intending to be limiting, the range of tolerable risk may be a 0% to 50% chance of damage. When the determined risk of damage is within this range, the vehicle remains stationary. When the determined risk of damage is outside this range, the vehicle may choose to relocate.

For relocation, the vehicle may seek a relocation space that is associated with a lower risk of damage to the vehicle. The nature of the relocation space depends on the type or mechanism of damage to the vehicle that is anticipated. For example, in the case of hail, covered spaces may be preferred. However, in the case of high winds, covered spaces may potentially be disfavored.

According to an aspect of the disclosure, attributes of relocation spaces may be ranked such that a plurality of possible relocation spaces may be evaluated and a preferred relocation space may be selected based on the attributes and their priorities. For example, in the case of hail, the vehicle's own garage may be the most preferred location. However, in the event that the private garage is not available, then a public garage may be a second most preferred location. In the event that a public garage is not available, it may be preferred to park under a publicly available structure (a bridge, a solid roof, etc.). In the event that a solid roof is not available, it may be desired to park beneath the tree to obtain some amount of protection from the hail.

By way of further example, the presence of strong winds, or the anticipation of strong winds, may bear on the selection of a relocation spot. For example, strong winds may be associated with damage due to loose roofing tiles, and therefore it may be preferred to maintain a distance from buildings (or buildings with tile roofs) whenever possible. Moreover, trees may be subject to breaking (such as branches breaking and being blown in the wind) or the tree falling over completely in situations of strong winds. Thus, it may be preferable to maintain a distance from trees in high when situations, if possible. As a matter of preference in such high when situations, public or private garages may provide a high level of safety. If public or private garages are unavailable, large public spaces (e.g. large parking spots, areas in front of a shopping center, etc.) may provide additional safety by maintaining a buffer space from objects that may be blown by the wind to result in damage. Under some circumstances, it may be desirable to determine a slipstream from buildings, depending on the wind direction, and seek safety within an area of the slipstream.

According to an aspect of the disclosure, a relocation spot may be a temporary relocation spot that is selected only for a period in which the risk of damage is anticipated to exist, or for a period in which the risk of damage is anticipated to remain outside of the acceptable range. That is, a relocation spot that would be unsuitable as a permanent or long-term parking spot may be selected temporarily.

According to an aspect of the disclosure, one or more legal jurisdictions may authorize use of a relocation spot that would otherwise be unauthorized, to be used on a short-term basis to protect the vehicle from damage. For example, in certain jurisdictions, it may not be permitted to park beneath the bridge. However, a bridge may provide shelter from certain weather elements and thus reduce risk of damage to the vehicle. One or more jurisdictions may authorize parking under the bridge on a temporary or emergent basis according to the principles described herein. Similarly, it is generally prohibited to come to a stop within a tunnel when the flow of traffic permits otherwise. However, a tunnel may provide shelter from one or more severe weather elements (e.g. hail), and thus it may be advisable to come to a stop in the tunnel during a period in which the risk of damage to the vehicle is outside of the acceptable range. In this case, one or more jurisdictions may authorize the stopping within a tunnel under these circumstances. Moreover, it may generally be prohibited to park in the private property of others without their permission. For example, it may be prohibited to park in another person's carport without their permission. However, an available carport may protect a vehicle from inclement weather. The vehicle (i.e., one or more processors of the vehicle) may be configured to leave the carport, should the rightful owner return. This can naturally occur even if leaving the carport would result in damage to the vehicle. One or more jurisdictions may authorize the temporary parking of the vehicle within another person's carport during a period in which the risk of damage to the vehicle is outside of the acceptable threshold. we might mention that in case the original owner comes back to use his car port, we would of course make it free again—even if this would mean some damage to our vehicle.

The legality of seeking shelter, as described immediately above, may have significant bearing on the actions of an autonomous vehicle. Autonomous vehicles may generally be programmed to reach decisions that correspond with applicable laws. That is, in the event that parking any particular location is deemed to be illegal, it may not be possible for the autonomous vehicle to seek shelter in that location. As such, it may be desirable or necessary to seek exceptions from legislative bodies to permit such parking under emergent circumstances. Alternatively or additionally, the autonomous vehicles may be programmed to temporarily disregard one or more applicable laws and temporarily seek shelter in a place that it is not otherwise permitted.

Because of the autonomous nature of the relocation, it may be desirable to provide a notification to the owner or regular driver that the vehicle has relocated itself. That is, the owner or regular driver will have ostensibly parked the vehicle at a given location, and without a notification that the vehicle has relocated itself, the owner or regular driver may seek the vehicle in vain at the original location. To that end, the vehicle may be equipped with a transmitter that is configured to provide a user notification. The user notification may be according to any known system for communication, without limitation. By way of example, the user notification may be delivered via a cellular text message, and Internet-based text message, a notification on an application of a user device, a voice call, a voicemail message, or otherwise.

According to another aspect of the disclosure, the vehicle may seek permission from the owner or regular driver for the relocation. That is, in the event that the vehicle determines a risk of damage to the vehicle outside of the range of acceptable risk, the vehicle may notify the owner or regular driver. According to one aspect of the disclosure, the vehicle may seek affirmative approval from the owner or regular driver to relocate. According to another aspect of the disclosure, the vehicle may simply inform the owner or regular driver of the intention to relocate, and assuming no express denial of permission to relocate is received by the vehicle from the owner or regular user, the vehicle may proceed with relocation. In this scenario, the vehicle may be configured to wait a predetermined period of time before relocating. As a nonlimiting example, the vehicle may be configured to wait five minutes after informing the vehicle owner or regular driver of the intention to relocate before the vehicle proceeds with relocation.

According to another aspect of the disclosure, the vehicle may be configured with a maximum distance for relocation. That is, the vehicle may be configured to seek alternative locations only within a predetermined distance from the current location. As nonlimiting examples, the vehicle may be configured to seek alternative locations no more than 20 meters from the vehicle, no more than 50 meters from the vehicle, no more than 100 meters from the vehicle, etc.

If the vehicle is given a predetermined maximum distance for relocation, the predetermined maximum distance for relocation may be dependent on the type of weather condition detected or predicted. That is, some weather conditions may be more associated with damage than others. For example, the risk of damage to an uncovered vehicle due to hail may be significantly higher than a general risk of damage to the vehicle due to wind. The vehicle may be configured to spend more time looking for alternative locations, or seek alternative locations, where necessary, farther from the current location for conditions like hail, which may be more likely to result in damage. Alternatively or additionally, the distance from the current location in which an alternative location may be sought, or the time spent seeking an alternative location, may be dependent on a magnitude of risk assessed. That is, as the assessed risk increases, the distance from the current location in which an alternative location may be sought, or the time spent seeking an alternative location, may also increase.

The principles and methods described herein may have an alternative or additional implementation with respect to convertible vehicles. That is, convertible vehicles may be particularly susceptible to certain types of damage when their top is open. For example, a convertible vehicle may be particularly susceptible to water damage due to rain by virtue of its top being open, whereas the danger of damage due to rain would be reduced or nonexistent if the top were closed. The principles and methods described herein may be modified in the case of a convertible vehicle to close the vehicle's top instead of causing the vehicle to travel to an alternative location. That is, the vehicle may be configured to assess the risk of damage due to weather, and in the event that the vehicle's top is open, and the type of damage due to weather is a type of damage for which an open-topped convertible is susceptible, the one or more processors may be configured to send a signal to control the vehicle to close its top. This may be performed instead of causing the vehicle to relocate. Alternatively, this may be performed in addition to causing the vehicle to relocate.

According to an aspect of the disclosure, principles and methods disclosed herein may be utilized for fleet management. That is, entire fleets of vehicles (e.g. car rental companies, mobility as a service companies etc.) may utilize the principles and methods described herein, and risks of danger to their vehicles due to weather may be assessed. For fleet management, it is conceivable that the vehicles may have dedicated parking spaces in a central location. Said parking spaces may be safe or safer than a current location of the vehicle. According to an aspect of the disclosure, when a danger to the vehicle due to weather is detected, the one or more vehicles of the fleet may be configured to relocate to their dedicated space or spaces.

Many current parking space providers (e.g. public parking garages) publicly provide real-time information about the availability of their parking spaces. This may be a simple availability number, such as stating a number of available parking spaces within a given parking garage, or it may be data that is specific to the available parking spaces, such as indicating identifying information about specific parking spaces that are currently available. This information may be available via websites, proprietary apps, publicly available databases, or otherwise. According to an aspect of the disclosure, the one or more processors may be configured to access such information about the availability of parking spaces, and may utilize this information to select an alternative location for relocation. That is, the one or more processors may be configured to identify one or more available parking spaces based on such publicly available information, and then cause the vehicles to travel to the one or more available parking spaces. This may be performed, for example, using one or more HD maps.

In the event that the vehicle parks in a parking space that is associated with a fee, the vehicle may be configured to pay the fee automatically. This may be performed using a proprietary interface or any other system that permits electronic payment of fees for parking spaces.

According to an aspect of the disclosure, a plurality of vehicles may be configured to communicate with one another, to allot available parking spaces. That is, it is conceivable that, in the case of a serious weather condition, many vehicles may concurrently or simultaneously seek available parking spaces. The criteria by which available parking spaces may be sought, may be potentially organize such that many vehicles attempt to park in a single parking space, whereas other parking spaces go ignored. According to an aspect of the disclosure, vehicles may be configured to wirelessly communicate with one another, or to communicate with a server or central body, to more equitably assign available parking spaces to the vehicles. This may be performed using any communication protocol, without limitation.

According to another aspect of the disclosure, it may be anticipated that a particular location for parking may become quickly crowded, and an alternative may be sought. For example, in the event that many vehicles simultaneously or concurrently seek parking, a nearby parking garage may quickly become crowded and potentially unusable. Rather than wasting time (particularly in the inclement weather), the one or more vehicles may be configured to abandon an effort to reach the parking garage and simply seek shelter elsewhere. This may include an attempt to seek shelter in a less desirable location. This decision may represent a trade-off that a less protective space that is more likely to be available may provide better overall protection than a more protective space that is unlikely to be available.

According to another aspect of the disclosure, the decision to seek shelter, and which shelter to be sought, may also be based at least in part on an expected accuracy of a weather report. Weather reports vary in accuracy, and many weather reports provide a percent likelihood that the predicted weather condition will in fact occur. It may be desirable to seek certain types of shelter based on the likelihood of occurrence. For example, should a weather report provide a small chance (i.e. a 5% chance) of hail, the one or more vehicles may be configured to seek shelter with a priority on the shelter being close, easily accessible, or otherwise, even when the shelter may not provide the strongest protection against the hail. Conversely, if the prediction of hail has a high likelihood, the one or more vehicles may be configured to spend additional resources (time, fuel, etc.) seeking a spot with greater protection.

According to another aspect, one or more user applications (apps) may be used to inform the user of a plurality of options for addressing a probable weather scenario. For each of the plurality of options, the one or more processors, via the app may be configured to provide the user with an estimated cost of each option. This may include, for example, the cost of fuel to arrive at the desired option, any parking fees associated with the desired option, the time required to utilize the desired option, expected damage to occur when reaching the desired option, etc. Alternatively or additionally, this information may be provided along with a likelihood of protection in the new location. With this information, the user may be in a better position to select an option that is most appropriate for the user. Should this configuration be used, the user may be given a period of time in which to respond. In the event that the response is not received within the period of time, the one or more processors may be configured to select a preferred option and carry that option out autonomous. The user can decide what to do. If the user does not react within a certain time, an automatic option might be chosen.

The word damage is used broadly throughout this disclosure to refer to any kind of damage that may result from weather conditions. Obvious examples thereof are used throughout, such as wind causing trees to fall on vehicles or tile to dislodge from roofs and strike vehicles, or such as hail causing damage to exterior vehicle surfaces and/or glass. It is expressly noted that many other kinds of damage resulting from weather are foreseeable, and the word damage should be understood broadly to include these forms of damage as well. This may include, for example, damage to any vehicle component or system, such as damage to one or more portions of an electrical system, computer system, combustion system, fuel system, cooling system, lubrication system, transmission system, drive system, exhaust system, suspension system, navigation system, dynamics system, networking system, wireless communication system, the chassis, any combination thereof; and/or any component thereof or combination of components thereof.

In furtherance of this understanding, damage resulting from weather may result from physical impact to a vehicle (such as in, but not limited to, the examples previously mentioned regarding hail and/or roof tiles). Damage may additionally or alternatively result from other weather-related conditions, such as high temperatures; low temperatures; excess moisture/humidity; low moisture/humidity; high water (flooding); physical damage to a surface of the vehicle due to snow or snow piles; physical damage to an undersurface (i.e. a carriage) of the vehicle due to snow or snow piles; damage to seals and/or gaskets; damage to tires and/or wheels; damage to fuel lines, one or more hoses, or one or more chains; based on any other weather-related condition; or generally to include any adverse effect on the vehicle arising, whether in whole or in part, out of weather or a weather-related condition.

Further disclosure is made by way of Example.

In Example 1, a vehicle relocator is disclosed including: one or more processors, configured to: receive first sensor data representing a current or predicted weather condition; receive second sensor data representing at least a position or a vicinity of a vehicle; determine from at least the first sensor data and the second sensor data a risk of damage to the vehicle; and if the determined risk is outside of a target range, send an instruction for the vehicle to travel to an alternate location.

In Example 2, the vehicle relocator of Example 1 is disclosed, wherein the second sensor data includes position data representing a detected position of the vehicle and map data representing a vicinity of the detected position.

In Example 3, the vehicle relocator of Example 1 is disclosed, wherein the second sensor data includes position data representing a detected position of the vehicle, and wherein the one or more processors are further configured to determine map data representing a vicinity of the vehicle based on the detected position and one or more stored maps.

In Example 4, the vehicle relocator of Example 2 or 3 is disclosed, wherein the one or more processors are configured to determine a hazard in a vicinity of the vehicle based at least on the detected position and the map data.

In Example 5, the vehicle relocator of Example 4 is disclosed, wherein the one or more processors are configured to determine the risk of damage using at least the current or predicted weather condition and the detected hazard.

In Example 6, the vehicle relocator of Example 5 is disclosed, wherein the one or more processors are further configured to identify the alternate location using the second sensor data.

In Example 7, the vehicle relocator of any one of Examples 1 to 6 is disclosed, further including receiving image sensor data representing a vicinity of the vehicle is disclosed, wherein the one or more processors are further configured to determine the alternate location using the image sensor data.

In Example 8, the vehicle relocator of any one of Examples 1 to 7 is disclosed, wherein the one or more processors are further configured to identify the alternate location as a location without a detected hazard.

In Example 9, the vehicle relocator of any one of Examples 1 to 7 is disclosed, wherein the one or more processors are further configured to identify the alternate location as a location at least a predetermined distance from the detected hazard.

In Example 10, the vehicle relocator of any one of Examples 1 to 9 is disclosed, wherein the second sensor data includes image sensor data representing a vicinity of the detected position.

In Example 11, the vehicle relocator of any one of Examples 1 to 10 is disclosed, wherein the one or more processors are configured to determine a hazard in a vicinity of the vehicle at least by detecting a hazard in the image sensor data.

In Example 12, the vehicle relocator of any one of Examples 1 to 11 is disclosed, wherein the one or more processors are configured to determine the risk of damage using at least the current or predicted weather condition and the detected hazard.

In Example 13, the vehicle relocator of any one of Examples 1 to 12 is disclosed, wherein the one or more processors are further configured to identify the alternate location using the second sensor data.

In Example 14, the vehicle relocator of any one of Examples 1 to 13 is disclosed, further including receiving position data representing a detected position of the vehicle and map data representing a vicinity of the detected position is disclosed, wherein the one or more processors are further configured to determine the alternate location using the detected position and the map data.

In Example 15, the vehicle relocator of any one of Examples 1 to 14 is disclosed, wherein the one or more processors are further configured to identify the alternate location as a location without a detected hazard.

In Example 16, the vehicle relocator of Example 15 is disclosed, wherein the one or more processors are further configured to identify the alternate location as a location at least a predetermined distance from the detected hazard.

In Example 17, the vehicle relocator of any one of Examples 1 to 16 is disclosed, wherein the first sensor data includes a meteorological observation.

In Example 18, the vehicle relocator of any one of Examples 1 to 17 is disclosed, wherein the first sensor data includes a meteorological prediction.

In Example 19, the vehicle relocator of any one of Examples 1 to 18 is disclosed, wherein the first sensor data includes any of thermometer data, barometer data, hydrometer data, anemometer data, or any combination thereof.

In Example 20, the vehicle relocator of Example 19 is disclosed, wherein the one or more processors are further configured to determine a current or predicted weather condition from the any of thermometer data, barometer data, hydrometer data, anemometer data, or any combination thereof.

In Example 21, the vehicle relocator of any one of Examples 1 to 20 is disclosed, wherein the current or predicted weather condition includes raining, flooding, wind, tornado, hurricane, tsunami, snow, hail, sleet, or any combination thereof.

In Example 22, the vehicle relocator of any one of Examples 1 to 21 is disclosed, wherein sending the instruction to travel to the alternate location includes controlling the vehicle to autonomously travel to the alternate location.

In Example 23, the vehicle relocator of any one of Examples 1 to 22 is disclosed, wherein sending the instruction to travel to the alternate location includes sending an instruction to one or more autonomous driving processors, for the one or more autonomous driving processors to control the vehicle to travel to the alternate location.

In Example 24, a vehicle relocation system is disclosed including: one or more first sensors, configured to receive first sensor information and to output first sensor data representing a current or predicted weather condition; one or more second sensors, configured to receive second sensor information any to output second sensor data representing at least a position or a vicinity of a vehicle; one or more processors, configured to: determine from the first sensor data and the second sensor data a risk of damage to the vehicle; and if the determined risk is outside of a target range, send an instruction for the vehicle to travel to an alternate location.

In Example 25, the vehicle relocation system of Example 24 is disclosed, wherein the one or more second sensors include a positioning sensor, and the second sensor data includes position data representing a detected position of the vehicle and map data representing a vicinity of the detected position.

In Example 26, the vehicle relocation system of Example 25 is disclosed, wherein the positioning sensor is a Global Positioning System sensor.

In Example 27, the vehicle relocation system of any one of Examples 24 to 26 is disclosed, further including one or more transceivers, configured to wirelessly send the detected position of the vehicle and to wirelessly receive map data representing a vicinity of the vehicle.

In Example 28, the vehicle relocation system of any one of Examples 24 to 27 is disclosed, further including one or more data storage units, configured to store map data.

In Example 29, the vehicle relocation system of Example 27 or 28 is disclosed, wherein the one or more processors are further configured to receive map data representing a vicinity of the vehicle based on the detected position and the stored map data.

In Example 30, the vehicle relocation system of any one of Examples 24 to 29 is disclosed, wherein the one or more processors are configured to determine a hazard in a vicinity of the vehicle based at least on the detected position and the map data in the vicinity of the vehicle.

In Example 31, the vehicle relocation system of Example 30 is disclosed, wherein the one or more processors are configured to determine the risk of damage using at least the current or predicted weather condition and the detected hazard.

In Example 32, the vehicle relocation system of any one of Examples 24 to 31 is disclosed, wherein the one or more processors are further configured to identify the alternate location using the second sensor data.

In Example 33, the vehicle relocation system of Example 32 is disclosed, wherein the one or more second sensors include one or more image sensors, configured to output image sensor data representing a vicinity of the vehicle, and wherein the one or more processors are further configured to determine the alternate location using the image sensor data.

In Example 34, the vehicle relocation system of any one of Examples 24 to 33 is disclosed, wherein the one or more processors are further configured to identify the alternate location as a location without a detected hazard.

In Example 35, the vehicle relocation system of any one of Examples 24 to 34 is disclosed, wherein the one or more processors are further configured to identify the alternate location as a location at least a predetermined distance from the detected hazard.

In Example 36, the vehicle relocation system of any one of Examples 24 to 35 is disclosed, wherein the second sensor data includes image sensor data representing a vicinity of the detected position.

In Example 37, the vehicle relocation system of Example 36 is disclosed, wherein the one or more processors are configured to determine a hazard in a vicinity of the vehicle at least by detecting a hazard in the image sensor data.

In Example 38, the vehicle relocation system of any one of Examples 24 to 37 is disclosed, wherein the one or more processors are configured to determine the risk of damage using at least the current or predicted weather condition and the detected hazard.

In Example 39, the vehicle relocation system of Example 38 is disclosed, wherein the one or more processors are further configured to identify the alternate location using the second sensor data.

In Example 40, the vehicle relocation system of any one of Examples 24 to 39 is disclosed, further including receiving position data representing a detected position of the vehicle and map data representing a vicinity of the detected position is disclosed, wherein the one or more processors are further configured to determine the alternate location using the detected position and the map data.

In Example 41, the vehicle relocation system of Example 40 is disclosed, wherein the one or more processors are further configured to identify the alternate location as a location without a detected hazard.

In Example 42, the vehicle relocation system of Example 40 or 41 is disclosed, wherein the one or more processors are further configured to identify the alternate location as a location at least a predetermined distance from the detected hazard.

In Example 43, the vehicle relocation system of any one of Examples 24 to 42 is disclosed, wherein the first sensor data includes a meteorological observation.

In Example 44, the vehicle relocation system of any one of Examples 24 to 43 is disclosed, wherein the first sensor data includes a meteorological prediction.

In Example 45, the vehicle relocation system of any one of Examples 24 to 44 is disclosed, wherein the first sensor data includes any of thermometer data, barometer data, hydrometer data, anemometer data, or any combination thereof.

In Example 46, the vehicle relocation system of Example 45 is disclosed, wherein the one or more processors are further configured to determine a current or predicted weather condition from the any of thermometer data, barometer data, hydrometer data, anemometer data, or any combination thereof.

In Example 47, the vehicle relocation system of any one of Examples 24 to 46 is disclosed, wherein the current or predicted weather condition includes raining, flooding, wind, tornado, hurricane, tsunami, snow, hail, sleet, or any combination thereof.

In Example 48, the vehicle relocation system of any one of Examples 24 to 47 is disclosed, wherein sending the instruction to travel to the alternate location includes controlling the vehicle to autonomously travel to the alternate location.

In Example 49, the vehicle relocation system of any one of Examples 24 to 47 is disclosed, wherein sending the instruction to travel to the alternate location includes sending an instruction to one or more autonomous driving processors, for the one or more autonomous driving processors to control the vehicle to travel to the alternate location.

In Example 50, a method of vehicle relocation is disclosed including: receiving first sensor data representing a current or predicted weather condition; receiving second sensor data representing at least position or a vicinity of a vehicle; determining from at least the first sensor data and the second sensor data a risk of damage to the vehicle; and if the determined risk is outside of a target range, sending an instruction for the vehicle to travel to an alternate location.

In Example 51, the method of vehicle relocation of Example 50 is disclosed, wherein the second sensor data includes position data representing a detected position of the vehicle and map data representing a vicinity of the detected position.

In Example 52, the method of vehicle relocation of Example 50 is disclosed, wherein the second sensor data includes position data representing a detected position of the vehicle; further including determining map data representing a vicinity of the vehicle based on the detected position and one or more stored maps.

In Example 53, the method of vehicle relocation of Example 51 or 52 is disclosed, further including determining a hazard in a vicinity of the vehicle based at least on the detected position and the map data.

In Example 54, the method of vehicle relocation of Example 53 is disclosed, wherein the risk of damage is determined using at least the current or predicted weather condition and the detected hazard.

In Example 55, the method of vehicle relocation of Example 54 is disclosed, further including determining the alternate location using the second sensor data.

In Example 56, the method of vehicle relocation of any one of Examples 50 to 55 is disclosed, further including receiving image sensor data representing a vicinity of the vehicle; wherein the alternate location is determined using the image sensor data.

In Example 57, the method of vehicle relocation of any one of Examples 50 to 56 is disclosed, wherein the alternate location is determined as a location without a detected hazard.

In Example 58, the method of vehicle relocation of any one of Examples 50 to 56 is disclosed, wherein the alternate location is determined as a location at least a predetermined distance from the detected hazard.

In Example 59, the method of vehicle relocation of any one of Examples 50 to 58 is disclosed, wherein the second sensor data includes image sensor data representing a vicinity of the detected position.

In Example 60, the method of vehicle relocation of any one of Examples 50 to 59 is disclosed, further including determining a hazard in a vicinity of the vehicle at least by detecting a hazard in the image sensor data.

In Example 61, the method of vehicle relocation of any one of Examples 50 to 60 is disclosed, wherein the risk of damage is detected using at least the current or predicted weather condition and the detected hazard.

In Example 62, the method of vehicle relocation of any one of Examples 50 to 61 is disclosed, further including determining the alternate location using the second sensor data.

In Example 63, the method of vehicle relocation of any one of Examples 50 to 62 is disclosed, further including receiving position data representing a detected position of the vehicle and map data representing a vicinity of the detected position; and determining the alternate location using the detected position and the map data.

In Example 64, the method of vehicle relocation of any one of Examples 50 to 63 is disclosed, further including determining the alternate location as a location without a detected hazard.

In Example 65, the method of vehicle relocation of Example 64 is disclosed, further including determining the alternate location as a location at least a predetermined distance from the detected hazard.

In Example 66, the method of vehicle relocation of any one of Examples 50 to 65 is disclosed, wherein the first sensor data includes a meteorological observation.

In Example 67, the method of vehicle relocation of any one of Examples 50 to 66 is disclosed, wherein the first sensor data includes a meteorological prediction.

In Example 68, the method of vehicle relocation of any one of Examples 50 to 67 is disclosed, wherein the first sensor data includes any of thermometer data, barometer data, hydrometer data, anemometer data, or any combination thereof.

In Example 69, the method of vehicle relocation of Example 68 is disclosed, further including determining a current or predicted weather condition from the any of thermometer data, barometer data, hydrometer data, anemometer data, or any combination thereof.

In Example 70, the method of vehicle relocation of any one of Examples 50 to 69 is disclosed, wherein the current or predicted weather condition includes raining, flooding, wind, tornado, hurricane, tsunami, snow, hail, sleet, or any combination thereof.

In Example 71, the method of vehicle relocation of any one of Examples 50 to 70 is disclosed, wherein sending the instruction to travel to the alternate location includes controlling the vehicle to autonomously travel to the alternate location.

In Example 72, the method of vehicle relocation of any one of Examples 50 to 71 is disclosed, wherein sending the instruction to travel to the alternate location includes sending an instruction to one or more autonomous driving processors, for the one or more autonomous driving processors to control the vehicle to travel to the alternate location.

In Example 73, one or more non-transient computer readable media configured to cause one or more processors, when executed, to perform the method of any one of Examples 50 to 72 are disclosed.

In Example 74, the vehicle relocator of any one of Examples 1 through 23, wherein damage comprises any one of damage to an exterior surface of the vehicle, damage to glass, cosmetic damage, or any combination thereof.

In Example 75, the vehicle relocator of any one of Examples 1 through 23 or 74, wherein damage comprises damage to any portion of the vehicle.

In Example 76, the vehicle relocator of any one of Examples 1 through 23, 74, or 75, wherein damage comprises damage to any system of the vehicle including, but not limited to, one or more portions of an electrical system, computer system, combustion system, fuel system, cooling system, lubrication system, transmission system, drive system, exhaust system, suspension system, navigation system, dynamics system, networking system, wireless communication system, the chassis, or any combination thereof.

In Example 77, the vehicle relocation system of any one of Examples 24 through 49, wherein damage comprises any one of damage to an exterior surface of the vehicle, damage to glass, cosmetic damage, or any combination thereof.

In Example 78, the vehicle relocation system of any one of Examples 24 through 49 or 77, wherein damage comprises damage to any portion of the vehicle.

In Example 79, the vehicle relocation system of any one of Examples 24 through 49, 77, or 78, wherein damage comprises damage to any system of the vehicle including, but not limited to, one or more portions of an electrical system, computer system, combustion system, fuel system, cooling system, lubrication system, transmission system, drive system, exhaust system, suspension system, navigation system, dynamics system, networking system, wireless communication system, the chassis, or any combination thereof.

In Example 80, the method of vehicle relocation of any one of Examples 50 through 72, wherein damage comprises any one of damage to an exterior surface of the vehicle, damage to glass, cosmetic damage, or any combination thereof.

In Example 81, the method of vehicle relocation of any one of Examples 50 through 72 or 80, wherein damage comprises damage to any portion of the vehicle.

In Example 82, the method of vehicle relocation of any one of Examples 50 through 72, 80, or 81, wherein damage comprises damage to any system of the vehicle including, but not limited to, one or more portions of an electrical system, computer system, combustion system, fuel system, cooling system, lubrication system, transmission system, drive system, exhaust system, suspension system, navigation system, dynamics system, networking system, wireless communication system, the chassis, or any combination thereof.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A vehicle relocator comprising:
   one or more processors, configured to:
   receive a first electrical signal from a first sensor, wherein the first electrical signal represents first sensor data corresponding to a current or predicted weather condition;
   receive a second electrical signal from a second sensor, wherein the second electrical signal represents second sensor data corresponding to at least a position or a vicinity of a parked autonomous vehicle;
   determine from at least the first electrical signal and the second electrical signal a risk of damage to the parked autonomous vehicle at the position or vicinity of the parked autonomous vehicle due to the current or predicted weather condition; and
   if the determined risk is outside of a target range, send an electrical signal representing an instruction for the parked autonomous vehicle to autonomously travel to an alternate location;
   wherein the one or more processors determining the risk of damage to the parked autonomous vehicle at the position or vicinity of the parked autonomous vehicle due to the current or predicted weather condition and instructing the parked autonomous vehicle to autonomously travel to the alternate location allows the vehicle relocater to control the parked autonomous vehicle to autonomously travel from an area of greater risk of damage due to the current or predicted weather to an area of lesser risk of damage due to the current or predicted weather.

2. The vehicle relocator of claim 1, wherein the second sensor data comprises position data representing a detected positon of the parked autonomous vehicle and map data representing a vicinity of the detected position.

3. The vehicle relocator of claim 1, wherein the second sensor data comprises position data representing a detected positon of the parked autonomous vehicle, and wherein the one or more processors are further configured to determine map data representing a vicinity of the parked autonomous vehicle based on the detected position and one or more stored maps.

4. The vehicle relocator of claim 3, wherein the one or more processors are configured to determine a hazard in a vicinity of the parked autonomous vehicle based at least on the detected position and the map data.

5. The vehicle relocator of claim 4, wherein the one or more processors are configured to determine the risk of damage using at least the current or predicted weather condition and the detected hazard.

6. The vehicle relocator of claim 5, wherein the one or more processors are further configured to identify the alternate location using the second sensor data.

7. The vehicle relocator of claim 1, wherein sending the instruction to travel to the alternate location comprises sending an instruction to one or more autonomous driving processors, for the one or more autonomous driving processors to control the parked autonomous vehicle to travel to the alternate location.

8. A method of vehicle relocation comprising:
   receiving a first electrical signal from a first sensor, wherein the first electrical signal represents first sensor data corresponding to a current or predicted weather condition;
   receiving a second electrical signal from a second sensor, wherein the second electrical signal represents second sensor data corresponding to at least position or a vicinity of a parked autonomous vehicle;
   determining from at least the first electrical signal and the second electrical signal a risk of damage to the parked autonomous vehicle; and
   if the determined risk is outside of a target range, sending an electrical signal representing an instruction for the parked autonomous vehicle to autonomously travel to an alternate location;
   wherein the determining the risk of damage to the parked autonomous vehicle at the position or vicinity of the parked autonomous vehicle due to the current or predicted weather condition and the sending the electrical signal representing the instruction for the parked autonomous vehicle to autonomously travel to the alternate location allows the vehicle relocater to control the parked autonomous vehicle to autonomously travel from an area of greater risk of damage due to the current or predicted weather to an area of lesser risk of damage due to the current or predicted weather.

9. The method of vehicle relocation of claim 8, wherein the second sensor data comprises position data representing a detected positon of the parked autonomous vehicle and map data representing a vicinity of the detected position.

10. The method of vehicle relocation of claim 8, wherein the second sensor data comprises position data representing a detected positon of the parked autonomous vehicle; further comprising determining map data representing a vicinity of the parked autonomous vehicle based on the detected position and one or more stored maps.

11. The method of vehicle relocation of claim 10, further comprising determining a hazard in a vicinity of the parked autonomous vehicle based at least on the detected position and the map data.

12. The method of vehicle relocation of claim 11, wherein the risk of damage is determined using at least the current or predicted weather condition and the detected hazard.

13. The method of vehicle relocation of claim 12, further comprising determining the alternate location using the second sensor data.

14. The method of vehicle relocation of claim 8, further comprising receiving image sensor data representing a vicinity of the parked autonomous vehicle; wherein the alternate location is determined using the image sensor data.

15. The method of vehicle relocation of claim 8, wherein the alternate location is determined as a location without a detected hazard.

16. The method of vehicle relocation of claim 8, wherein the alternate location is determined as a location at least a predetermined distance from the detected hazard.

17. The method of vehicle relocation of claim 8, wherein the second sensor data comprises image sensor data representing a vicinity of the detected position.

18. The method of vehicle relocation of claim 17, further comprising determining a hazard in a vicinity of the parked autonomous vehicle at least by detecting a hazard in the image sensor data.

19. The method of vehicle relocation of claim 8, wherein the risk of damage is detected using at least the current or predicted weather condition and the detected hazard.

20. One or more non-transitory computer readable media configured to cause one or more processors, when executed, to perform the method of:
   receiving a first electrical signal from a first sensor, wherein the first electrical signal represents first sensor data corresponding to a current or predicted weather condition;
   receiving a second electrical signal from a second sensor, wherein the second electrical signal represents second sensor data corresponding to at least position or a vicinity of a parked autonomous vehicle;
   determining from at least the first electrical signal and the second electrical signal a risk of damage to the parked autonomous vehicle; and
   if the determined risk is outside of a target range, sending an electrical signal representing an instruction for the parked autonomous vehicle to autonomously travel to an alternate location;
   wherein the determining the risk of damage to the parked autonomous vehicle at the position or vicinity of the parked autonomous vehicle due to the current or predicted weather condition and the sending the electrical signal representing the instruction for the parked autonomous vehicle to autonomously travel to the alternate location allows the vehicle relocater to control the parked autonomous vehicle to autonomously travel from an area of greater risk of damage due to the current or predicted weather to an area of lesser risk of damage due to the current or predicted weather.

21. The vehicle relocator of claim 1, wherein the first sensor data comprises any of thermometer data, barometer data, hydrometer data, anemometer data, or any combination thereof.

* * * * *